June 2, 1942.　　　　L. W. DAVIS　　　　2,285,255
FILAMENT TESTING APPARATUS
Filed Nov. 3, 1939　　　4 Sheets-Sheet 1
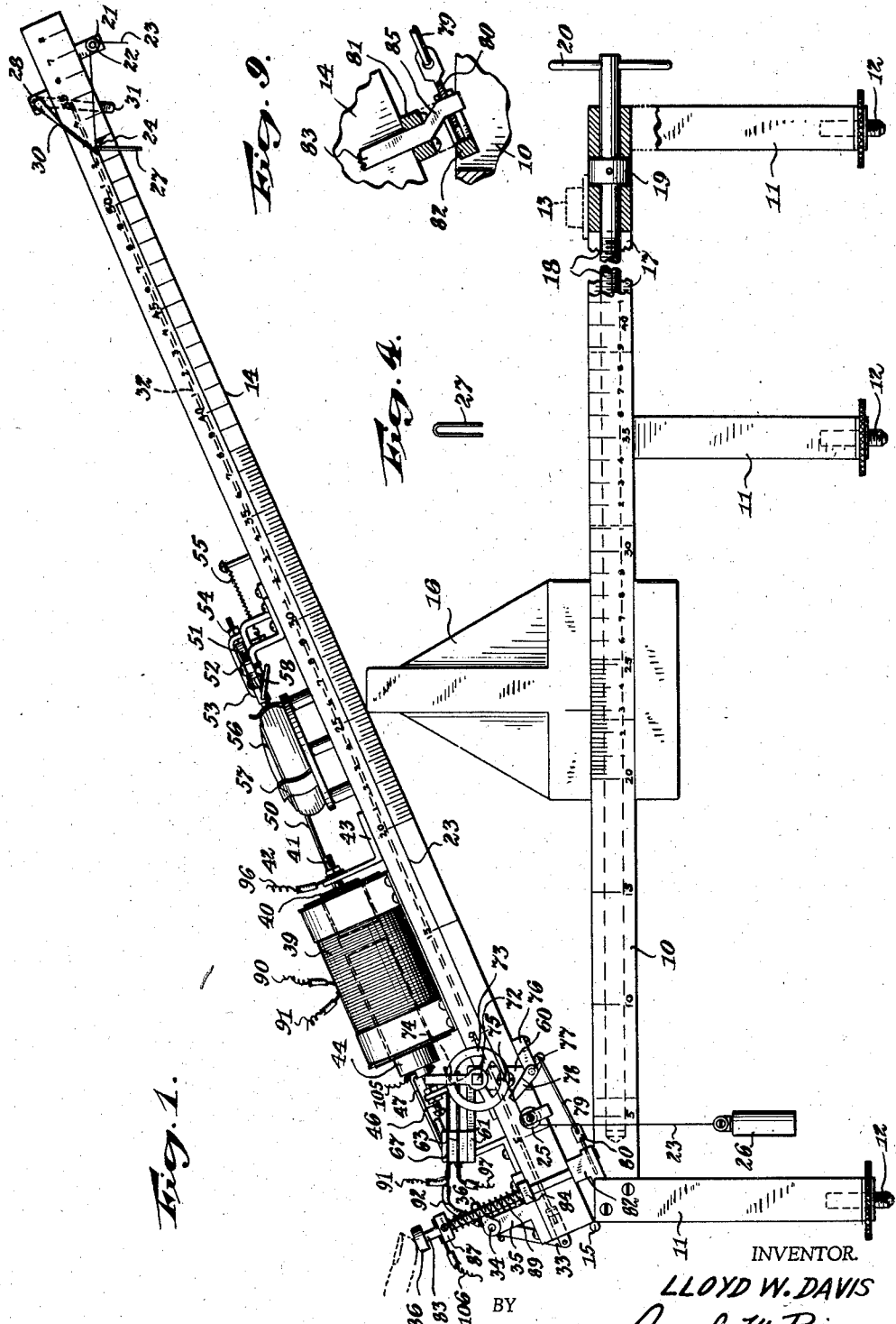
INVENTOR.
LLOYD W. DAVIS
BY
Angelo M. Pisarra
ATTORNEY.

June 2, 1942.                L. W. DAVIS                2,285,255
                      FILAMENT TESTING APPARATUS
                        Filed Nov. 3, 1939            4 Sheets-Sheet 2
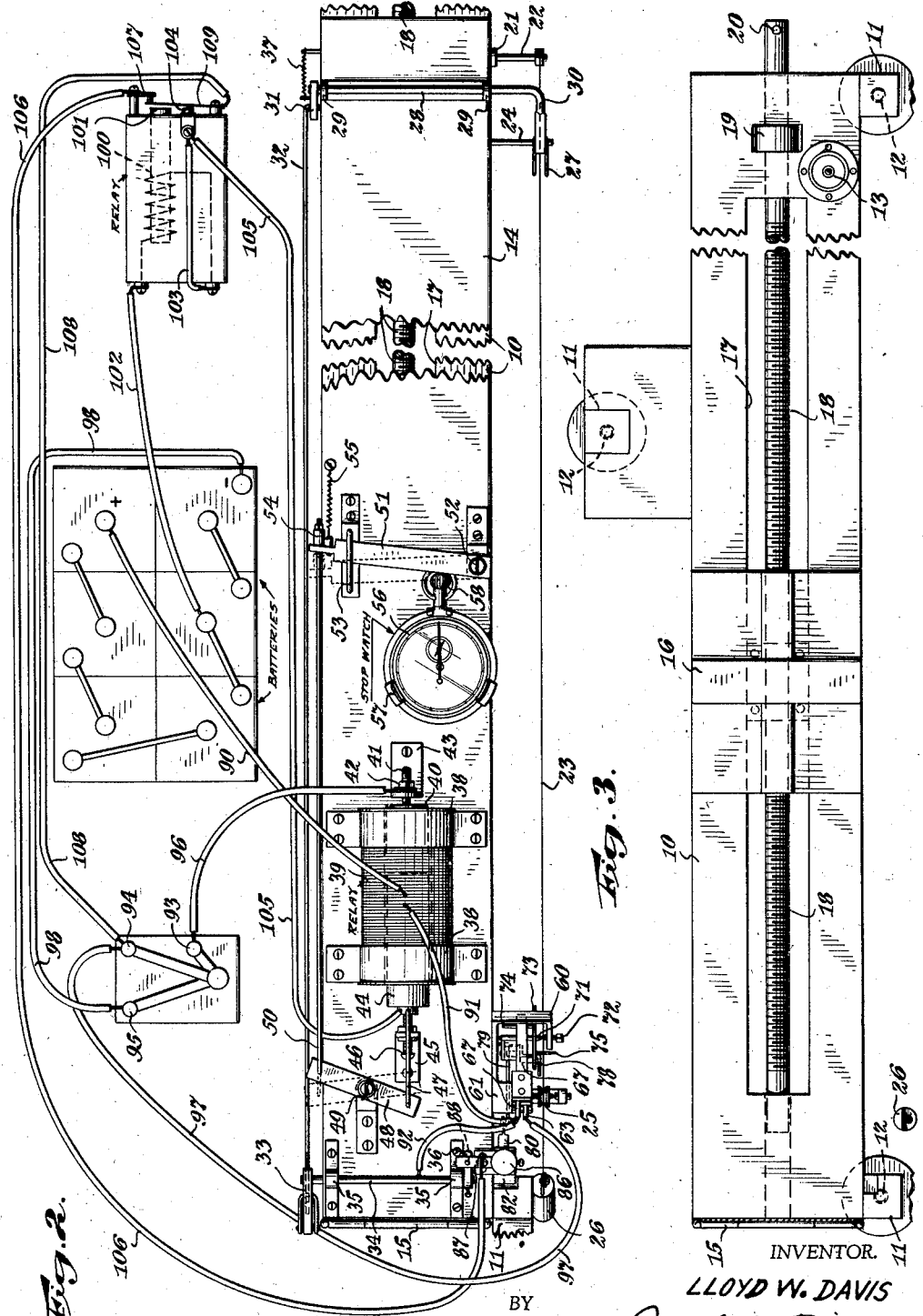
INVENTOR.
LLOYD W. DAVIS
BY Angelo M. Pisarra
ATTORNEY.

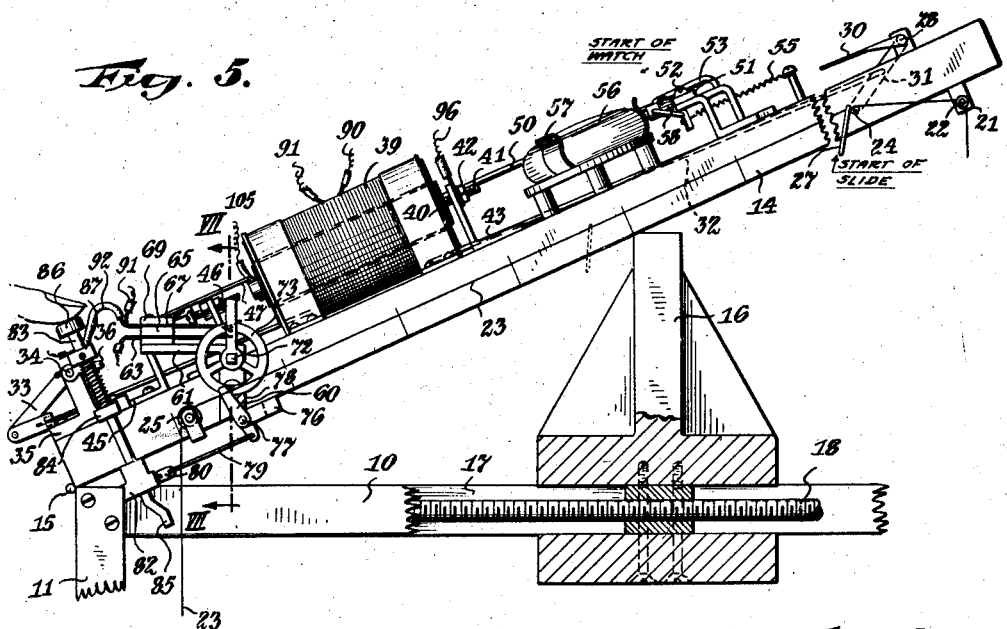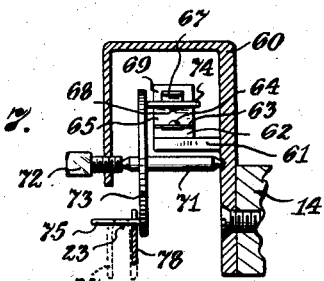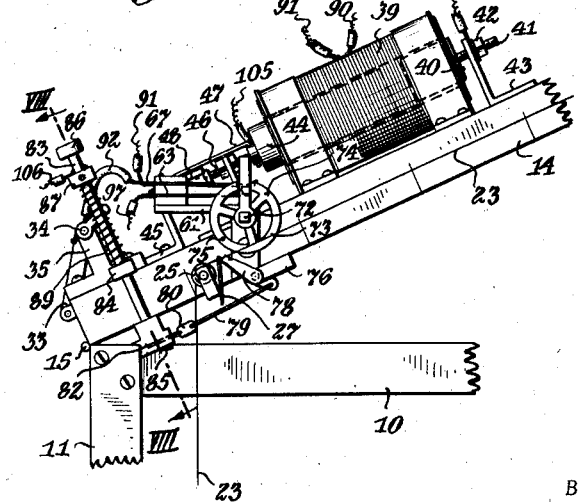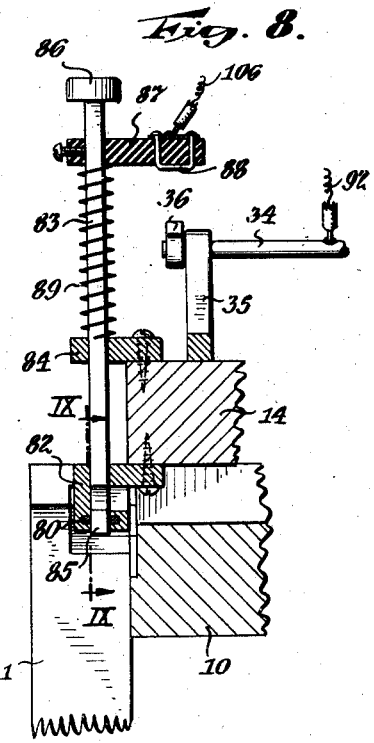

June 2, 1942.　　　L. W. DAVIS　　　2,285,255

FILAMENT TESTING APPARATUS

Filed Nov. 3, 1939　　　4 Sheets-Sheet 4

INVENTOR.
LLOYD W. DAVIS
BY Angelo M. Pisarra
ATTORNEY.

Patented June 2, 1942

2,285,255

UNITED STATES PATENT OFFICE 2,285,255

FILAMENT TESTING APPARATUS

Lloyd W. Davis, Bloomfield, N. J., assignor to National Oil Products Company, Harrison, N. J., a corporation of New Jersey Application November 3, 1939, Serial No. 302,706

13 Claims. (Cl. 73—51)

This invention relates to devices for testing materials. In one of its specific aspects the invention is directed to apparatus for determining the frictional characteristics of materials and especially of those materials of filamentary or thread form.

An object of this invention is to provide a novel apparatus which is practical and accurate for determining the frictional characteristics of a single strand of yarn, thread, wire or other filament in a simple and facile manner.

Another object of this invention is to provide a novel apparatus for measuring the frictional characteristics of material and which apparatus requires only a small quantity of the material to be tested in order to obtain its frictional characteristics.

Another object of this invention is to provide a novel apparatus for determining the frictional characteristics of material, which apparatus is substantially automatic in operation and therefore eliminates variations due to human error.

Another object of my invention is to provide a novel apparatus for measuring the frictional characteristics of material in an easy and rapid manner.

These and other objects of the invention will be readily apparent from the following description and drawings, wherein:

Figure 1 represents a side elevation of an apparatus embodying my invention, and shows the position of the unit or element to be tested thereby as well as the relative position of the parts with all four switches of the electric circuits being open and as shown in Figure 10.

Figure 2 is a top plan view of the apparatus embodying the invention.

Figure 3 is a top plan view of the sliding element and platform therefor together with the actuator for the sliding element.

Figure 4 is a side view of the inverted U-shaped sliding rider.

Figure 5 is a side view of a portion of the apparatus embodying the invention and shows the relative positions of the parts after two of the switches are closed as shown in Figure 11 whereupon the sliding rider is free to slide along the element or unit to be tested.

Figure 6 is a side view of a portion of the apparatus embodying the invention and shows the relative positions of the parts after the sliding rider has reached its limit of travel.

Figure 7 is a cross sectional view taken on line VII—VII of Figure 5 in the direction of the arrows.

Figure 8 is a cross sectional view taken on line VIII—VIII of Figure 6 in the direction of the arrows.

Figure 9 is a cross sectional view taken on line IX—IX of Figure 8 in the direction of the arrows.

Figure 10:
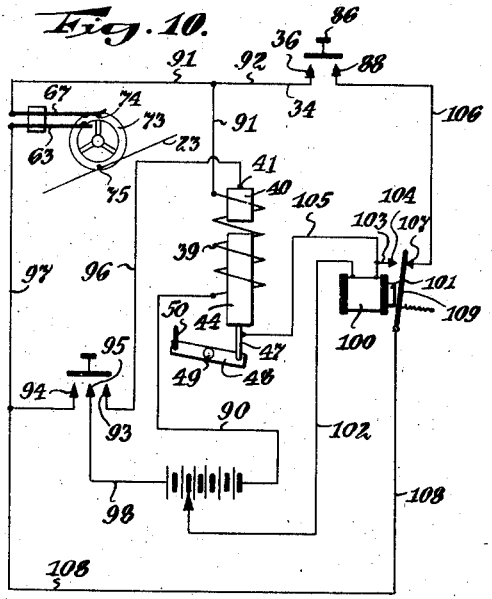
Figures 10–13 show a wiring diagram and show the different positions of the switch contacts at different stages during operation of the novel apparatus embodying the novel circuits and combination of circuits.

As shown in the drawings, wherein there is illustrated one of the preferred embodiments of the invention, the novel apparatus comprises a wooden base 10 to which are secured three depending wooden legs 11 terminating in adjustable leveling screws 12 which may be adjusted so that the base 10 may be leveled or located at any desired angular position which is visible on a spirit level 13 mounted on the upper face of base 10 at the rear end thereof. A flat wooden board or table 14 is hinged at 15 to the base 10 at the fore end thereof so that the inclinations of said table 14 may be varied at will, by moving a supporting member 16 which is slidably mounted on the base 10 and in a slot 17 extending along a major part of the lengths thereof.

That portion of member 16 which is located in the slot 17 has an opening therethrough in which is threaded a screw or threaded shaft 18. The shaft 18 is unthreaded at its rear end and secured thereto is a stop collar 19 journalled in the rear end of the base 10. The shaft 18 extends outwardly beyond the rear extremity of base 10 and has a handle 20 at that end thereof. When the handle 20 is rotated in one direction the shaft 18 and stop collar 19 are rotated in the same direction and the member 16 is fed along the length of the shaft 18 forwardly in the direction away from the handle 20 and towards the hinge 15 to force the rear end of table 14 upwardly and thus increase the angle between the base 10 and the table 14 and thus increase the inclination of the table 14 to the base 10. When it is desired to reduce the angle or the inclination between plate 10 and table 14, the handle is counter-rotated whereupon the element 16 feeds along the shaft 18 and towards handle 20 and the rear end of table 14 moves downwardly by the force of gravity.

One side of the base or bed plate 10 is graduated along its length as is the corresponding side of the table 14, and these spacial graduations indicate distances from the center of hinge or pivot 15. The lower part of the element 16 has a mark line thereon in line with the upper fore corner of the element 16 which bears against the underside of table 14 and the graduation above that fore corner and the graduation below the mark line are read and the distance between the upper edge and the lower edge of the element 16 bearing respectively against the table 14 and base 10 is constant and with these facts available the trigonometric function of the angle between the table 14 and base 10 may be readily computed.

Depending from the bottom of table 14 is a short metallic strip 21 having an outwardly projecting bolt 22 secured thereto. The element or unit 23 to be tested, and as shown being a thread has one end thereof wrapped around bolt 22 to anchor the same thereto. From its anchored end at 22, the thread 23 extends upwardly and forwardly over a grooved guide pin 24 extending outwardly from the side of table 14, and thence over a grooved guide roller 25 secured to the lower end of the table 14. The free end of the thread 23 is secured to a weight 26 which maintains the thread 23 taught along the path from bolt 22 over pin 24, over roller 25 to weight 26. This same weight 26 may be used in making comparative tests so that all of the elements or units to be tested are under the same tensional force.

An inverted U-shaped iron or steel rider 27 is mounted on the element 23 to be tested in the manner shown in Figure 1 and is maintained at the position of the pin 24 by a retainer which may be actuated to operative and inoperative positions. The retainer may be an L-shaped element having the long arm 28 thereof cylindrical and journalled in bearings 29 secured to the table 14. The short arm 30 of the retainer extends downwardly and when in operative position its free end bears against rider 27 on element 23 to maintain the rider 27 against pin 24 which is to be its starting point of rider travel. The end of the long arm 28 away from the short arm 30 is rigidly secured to one end of a link 31. One end of a long link or rod 32 is loosely pivoted to the other end of the link 31. The link 32 extends alongside of table 14 and the other end thereof is loosely pivoted to one end of a link 33 whose other end is rigidly secured to one end of an electrical conducting rod or shaft 34 journalled in bearings 35 secured to table 14 at the fore end thereof.

Secured to the other end of shaft 34 is an electrically conducting projecting element 36. A tension spring 37 has one end secured to the end of link 31 away from arm 28 and its other end secured to a pin secured to table 14. This spring 37 acts upon the link 31 to pull the link or rod 32 and maintain projection 36 in its upper position and also to act upon the arm 28 to maintain arm 30 against the rider 27 to maintain the rider in its upper extreme position.

Located in one end of coil 39 and insulated therefrom is a soft iron or magnetic stop 40 maintained in fixed position by a threaded projection 41 integral therewith and secured by nut 42 to an angle iron 43 fixedly secured to table 14. A movable armature 44 of highly magnetic material, such as, soft iron or the like, is insulated from coil 39, is located at the other end of said coil 39 and extends therein. An angle plate 45 is spaced from the exposed end of armature 44 and has fixedly secured thereto an adjustable stop 46 for limiting the degree of travel of armature 44 when the coil 39 is de-energized.

Also secured to the outer end of the armature 44 is a link 47. Projection or link 47 extends over element 45 and its other end is pivotally mounted to one end of a link 48 which is free to rotate on a pivot 49 at the center of link 48. Pivotally mounted on the other end of link 48 is a long link or rod 50 whose other end extends through an enlarged opening in one end of a link 51 whose other end is mounted on pivot 52. The link 51 extends through a guide and stop inverted U element 53 secured to table 14 to limit the degree of swing of the link 51.

That end of the rod 50 which extends beyond the link 51 has a nut stop or boss 54 secured thereto. A tension spring 55 has one end thereof secured to table 14 and its other end secured to the link 51 near the enlarged opening therein. The spring 55 tends to maintain the link 51 in one extreme position against one of the sides of element 53 and rod 50 is pulled towards the upper free end of table 14 and the link 48 is swung about pivot 49 to pull armature 44 away from the element 40.

A crown stop watch 56 is detachably mounted in a holder 57 therefor. The holder 57 is secured to table 14 and mounted on its upper face. The knurled end or crown 58 of the stem of said watch is located close to one side of the link 51 and is in the path of said link 51 so that the stem may be moved upon actuation of said link 51 to trip said watch 56 for starting and stopping and resetting the same.

A supporting plate 60 is secured to one side of table 14 and integral with plate 60 and at an angle thereto is a supporting plate 61 on which is secured an insulator 62. Mounted on said insulator 62 is a long rigid contact 63 having a contact tip 64 at the free end thereof. An insulator 65 is mounted on the contact 63 and on insulator 65 is a long spring contact 67 having a contact tip 68 at the free end thereof. Mounted on the contact 67 is an insulator 69. The contact 67 normally presses towards contact 63 at the free end thereof and the contact tips 64 and 68 are normally in contiguous relationship if no outside force is applied thereto.

The element 60 extends upwardly from table 14 in the form of an inverted U. A pin or shaft 71 is rotatably mounted across said U member 6, with one end thereof disposed in a conical depression in one arm of element 60 and the other end bearing in the recessed end of an adjustable bolt 72 threadedly mounted in the other arm of element 60. By adjusting the bolt 72, the degree of force necessary to rotate shaft 71 may be controlled. The element 60 extends partially around the free ends of spring contacts 63 and 67.

The axis 71 has a small wheel 73 rigidly secured thereto and located between one arm of the element 60 and the contacts 63 and 67. A pair of diametrically opposed pins 74 and 75 are secured to said wheel and are so disposed that when the wheel 73 is rotated in one direction, the pin 74 strikes the upturned end of the contact 67 to force the contact tip 65 away from contact tip 64 and thus provide an insulating space therebetween, as shown in Figures 1, 5 and 7.

A support 76 for a pivot 77 is secured to the under side of table 14. Mounted on said pivot 77 at a point between its ends is a lock lever 78 having a notch in one side near the free extremity thereof. A link rod 79 has one end pivotally mounted in an enlarged opening in the lower end of lever 78 and its other end is pivotally mounted in an enlarged opening at one end of a follower 80 located in a housing and guide 82. The follower 80 may be a flat disc or plate having an opening therein adapted to accommodate a cam or actuator. The actuator may be an elonagted rod 83 extending through aligned openings in guide 81 and through guide 84 secured to table 14. The lower part 85 of rod 83 is bent upwardly towards the free end of table 14 and finally terminates in a portion which is parallel to the upper part of rod 83 to provide a cam or offset actuating device for the follower 80.

The upper part of rod 83 terminates in a knob 86. Adjustably secured to rod 83 is an insulating projecting element 87 having a contact 88 secured thereto and disposed above the projecting element 36. In order to normally maintain the rod 83 in its uppermost position, a coiled spring 89 is mounted around rod 83 and between guide 84 and projection 87. This spring 89 tends to push the rod to its uppermost position and normally hold it in its upper position.

A suitable source of electric energy is provided and for this purpose, there may be used six dry cells connected in series. A conductor 90 is connected to the positive terminal of one of the extreme batteries of the series and to one end of the conducting wire which forms coil 39. The other end of the wire forming coil 39 is electrically connected to one end of conductor 91 whose other end is electrically connected to contact 67. A conductor 92 is also electrically connected to contact 67 and its other end is electrically connected to the conducting shaft 34. A switch having three contacts 93, 94 and 95 may be located at any convenient place. A conductor 96 has one end electrically connected to the conducting projection 41 and its other end electrically connected to the contact 93. One end of an electrical conductor 97 is electrically connected to contact 63 and its other end is electrically connected to contact 94. A conductor 98 is electrically connected to one end of contact 95 and its other end to the negative pole of the other extreme battery of the series. A relay, which may include a conducting coil 100 in which is located a stationary soft iron core 101, may also be located at any convenient place. The core 101 is insulated from coil 100. A conductor 102 has one end thereof electrically connected to the positive pole of one of the intermediate batteries of the series and its other end to one end of the coil 100. The other end of the coil 100 is electrically connected to one end of conductor 103 whose other end is electrically connected to stationary contact 104 located alongside of one end of armature 101.

One end of a conductor 105 is electrically connected to armature 44 and its other end is electrically connected to contact 104. One end of a conductor 106 is electrically connected to the contact 88 on projection 87 and its other end is electrically connected to a contact 107 located near core 101. One end of a conductor 108 is electrically connected to contact 94 and its other end to the fixed end of a resilient armature contact 109 located in the path between contact 107, one end of armature 101 and contact 104. The resiliency of the armature 109 itself normally maintains the armature 109 away from contact 104 and contiguous with contact 107 to complete a circuit thereat. When the core 101 is energized the armature 109 is pulled to the core 101 and contact between armature 109 and contact 107 is "broken" but is made between armature 109 and contact 104.

In operation, the screws 12 are adjusted so that the bed 10 is level as indicated by the spirit level 13. The angle of inclination of table 14 with respect to bed 10 is adjusted by turning the handle 20 which rotates the shaft 18 whereupon the element 16 is moved in the desired direction on bed 10. The element 23 to be tested has one end anchored to bolt 22 and thence extends in the groove in guide pin 24, over the freely pivoted grooved roller 25 and has a weight 26 attached to its other end to maintain taut the stretch thereof between pin 24 and grooved roller 25. The stop watch may be one of the crown start, stop and flyback type calibrated to 0.01 second on the dial and is set at zero. The wheel 73 is rotated until the pin 74 forces the free end 68 of contact 67 away from and out of contact with the free end 64 of contact 63 and the pin 75 is tangent to the element 23 at a point near roller 25 and between roller 25 and pin 24. The steel rider 27 is then hung on the upper end of element 23 and retained thereat near the pin 24 by retainer 30.

Figure 11:
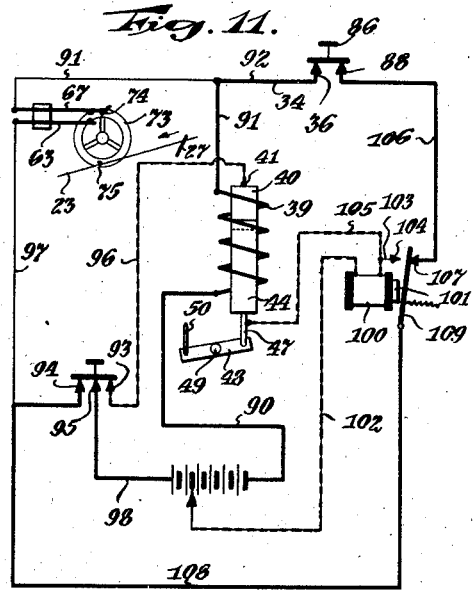

All of the electrical switches are open at this stage as shown in Figure 10. The free ends of contacts 93, 94 and 95 constitute a tap switch and are brought into contact with each other by merely pressing down upon them manually. This condition is maintained and the button 86 is pressed downwardly to actuate rod 83 which moves the projection 87 downwardly whereupon contact 88 engages contact projection 36 and just prior thereto the follower 80 and link 79 are retracted and swing the lever 78 to locked position where the pin 75 is located in the notch in said lever 78 as shown in Figure 5 whereupon the wheel 73 is locked in position and may not be accidentally rotated to allow the contact tips 64 and 68 to come together. With the free ends of contacts 93, 94 and 95 contiguous and the contacts 88 and 36 contiguous, the circuit shown in the heavy or dark lines of Figure 11 is completed. Practically simultaneously with the making of said circuit, the downward movement of the projection 87 causes the projection 87 acting upon projection 36 to rotate the shaft 34 which in turn swings link 33 to actuate rod 32 which swings lever 31 against the action of spring 37 to rotate shaft 28 in bearings 29 and thus swing retainer 30 to inoperative position whereupon the rider 27 slides freely downwardly on the element 23. The electrical circuit thus made is as follows: from the positive pole of an extreme battery of the series through the conductor 90, conducting coil 39, conductor 91, conductor 92, conducting shaft 34, conducting projection 36, contact 88, conductor 106, contact 107, conductor 108, contact 94, contact 95 and conductor 98 to the negative terminal of the extreme battery of the series.

Immediately upon making of this circuit, which is instantaneous, the armature 44 is energized and is pulled by the electric field to the conducting element 40. In moving to the element 40, the armature 44 pulls on the link 47 to swing lever 48 about the pivot 49 and pulls rod 50 to swing lever 51 against action of spring 55 about pivot 52. The lever 51 in the course of this movement presses against the crown 58 of the stem of the watch to start the watch. Thus the starting of the watch and the release of the rider are substantially or practically simultaneous.

As soon as armature 44 comes in contact with stop contact 40, a second circuit is made and this second circuit is as follows: from the positive pole of an intermediate battery of the series through conductor 102, coil 100, conductor 103, contact 104, conductor 105, armature 44, armature stop 40, conductor projector 41, conductor 96, contact 93, contact 95 and conductor 98 to the negative pole of an extreme battery of the series. This circuit comes into existence while the first circuit is in being and when said second circuit is made, it is only of temporary duration due to the actuation of the armature 109 by the core 101, the armature 109 moves away from contact 107 breaking the first circuit and as soon as the first circuit is broken, the coil 39 is deenergized and armature 44 is actuated by the force of gravity to move away from stop 40 and the second circuit is broken, but the armature 109 actuated by the core 101 pulls the armature thereto to establish contact between armature 109 and contact 104 to establish the circuit shown in heavy lines in Figure 12, all of this being substantially instantaneous.

When the armature 44 drops away from stop 40, it moves to the stop 45 which limits its outward travel. In the course of this movement, link 47 is moved and counterswings link 48 about pivot 49 to push rod 50 and counterswing link 51 about 52 to its upper position and away from the crown 58 of watch 56 which was started upon the first swing of link 51 against crown 58.

Figure 12:
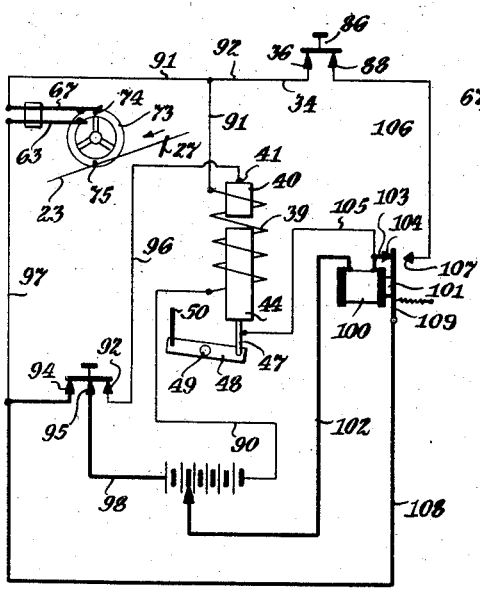

The circuit shown in heavy lines in Figure 12 is the third circuit made and is as follows: from the positive terminal of an intermediate battery of the series through conductor 102, winding 100, conductor 103, contact 104, resilient armature 109, conductor 108, contact 94, contact 95 and conductor 98 to the negative terminal of an extreme battery of the series. This circuit is established before the rider 27 gets alongside of the winding 39 and armature 44 in its course of travel to eliminate the electric field thereat which, if allowed to exist, would act upon the rider 27 and affect its speed of travel along the element 23. This electric field could be eliminated by releasing the button 86 to break the circuit, but this is not practical because it cannot be done rapidly enough in a manual manner.

Before rider 27 has reached wheel 73 and after the rod 83 has been pressed to its lower limit of travel it is released and it is forced back to its original position by spring 89 and in this position the contact 88 is away from projection 36. In the course of reaching its uppermost position rod 83 acting through the cam part 85 thereof pushes the follower 80 which acts upon link 79 to actuate lever 78 whereupon lever 78 disengages pin 75 and lever 78 is disposed in inoperative position. As projection 87 moves away from projection 36, spring 37 actuates lever 31 to return retainer 30 and lever 36 to their original positions.

Figure 13:
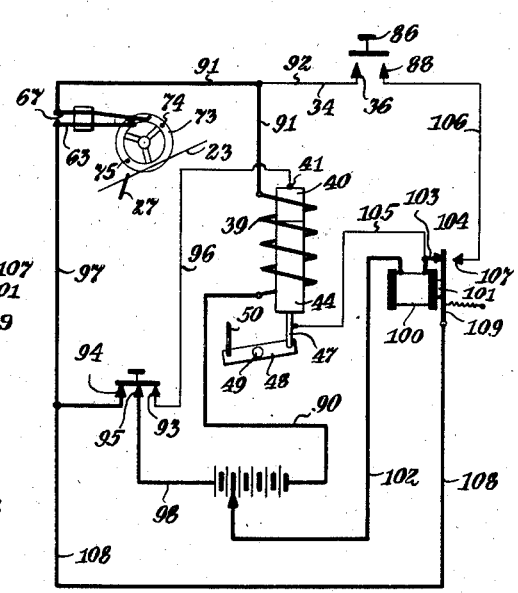

With the third circuit in being the rider 27 on its slide along element 23, strikes the now unlocked pin 75 to cause the wheel 73 to "snap rotate" and in the course of this rotation, the pin 74 is disengaged from the contact 67 whose free end now snaps down upon the free end of contact 63 to a closed or operative position where the free ends of these contacts are contiguous. Thereupon a fourth circuit comes into being and is in electrical parallel with the third circuit which is still in being, both of these circuits shown in heavy lines of Figure 13. The fourth circuit is as follows: from the positive terminal of an extreme battery of the series through conductor 90, winding 39, conductor 91, contact 69, contact 63, conductor 97, contact 94, contact 95 and conductor 98 to the negative terminal of the other extreme battery of the series. With these two circuits in being, the armature 44 is again energized and is pulled upwardly and pulls on link 47 to swing lever 48 about pivot 49 and pulls rod 50 to swing lever 51 against the action of spring 55 about pivot 52. In the course of this swinging movement of lever 51, lever 51 presses against crown 58 to stop the watch. The pressure is released from the free ends of contacts 93, 94 and 95 after the watch has been stopped and now the watch reading is taken and the frictional characteristic of element 23 is computed.

In order to set the apparatus for another test all that need be done is to substitute the new element to be tested in place of the originally tested element 23, the free ends of contacts 93, 94 and 95 are brought together temporarily by a tap thereof whereupon, the watch is reset to zero. Then the wheel is rotated in position to separate contacts 63 and 67 and to dispose the pin 75 tangent to the new element to be tested and the rider 27 is placed on the new element to be tested at the pin 24 and behind retainer 30.

With the apparatus embodying the invention, a large number of different elements, particularly filamentary elements, may be tested in a comparatively short time and does not require a highly skilled person to operate the same. The filamentary elements may be any desirable yarn, thread or filament composed of cotton, wool, cellulose hydrate, cellulose esters, cellulose ethers, casein, glass, synthetic resins, ramie, hemp, steel or other metals, etc. Likewise the rider 27 may be composed of any suitable material such as coated or uncoated steel or any other metal or solidified plastic material. The apparatus of the invention is particularly useful in ascertaining and comparing the utility and efficiency of various lubricants which are applied to the filamentary elements under test. The apparatus of the invention has particular utility in connection with research involving the production of improved lubricants for textile yarns and threads.

Since certain changes may be made in the aforedescribed construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention, which as a matter of language might be said to fall therebetween.

What is claimed:

1. A filament testing apparatus comprising supporting means for supporting at an angle to the horizontal a filament to be tested, means for maintaining said filament taut, the entire space immediately adjacent a major portion of said taut filament being completely unobstructed, sliding means adapted to be moved solely by its own force due to gravity freely along the surface of said filament, said sliding means being totally supported by said filament for free movement thereon actuable means for retaining said sliding means at a particular location on said filament, a time indicator, means for substantially simultaneously starting said indicator and actuating said actuable means to inoperative position whereupon said sliding means will slide along said filament and means rendered operative, by said sliding means when in the course of its travel, it reaches a particular part of said filament, to stop said indicator, said last mentioned means including an electric circuit and electro-responsive means.

2. A filament testing apparatus comprising supporting means for supporting at an angle to the horizontal, a filament to be tested. means for maintaining said filament taut, the entire space immediately adjacent a major portion of said taut filament being completely unobstructed, sliding means adapted to be moved solely by its own force due to gravity freely along the surface of said filament and guided by said filament in its course of travel, said sliding means being totally supported by said filament for free movement thereon, pivoted means for retaining said sliding means at a particular location on said filament, a time indicator, means for actuating said pivoted means to inoperative position whereby said sliding means is released and will by its own force due to gravity freely slide along the surface of said filament, means for starting said time indicator substantially simultaneously with said release of said sliding means and including an electric circuit and electro-responsive means, and means rendered operative, by said sliding means when in the course of its travel, it reaches a particular part of said filament, to stop said time indicator, said last means including said electro-responsive means and an electric circuit.

3. A filament testing apparatus comprising supporting means for supporting at an angle to the horizontal a filament to be tested, sliding means adapted to be moved by its own force due to gravity along the surface of said filament, pivoted means for retaining said sliding means at a particular location on said filament when said pivoted means is in operative position, resilient means for normally maintaining said pivoted means in operative position, means for actuating said pivoted means against the action of said resilient means, to inoperative position whereby said sliding means is released and will by its own force due to gravity freely slide along the surface of said filament, means for starting said time indicator substantially simultaneously with said release of said sliding means and comprising a circuit including a solenoid and an electro-responsive element adapted to be actuated by said solenoid when energized, and means rendered operative, by said sliding means when in the course of its travel, it reaches a particular part of said filament, to stop said time indicator and comprising an electric circuit including said solenoid and said electro-responsive element.

4. In a filament testing apparatus; supporting means for supporting at an angle a filament to be tested, means for maintaining said filament taut, the entire space immediately adjacent a major portion of said taut filament being completely unobstructed, sliding means adapted to be moved freely along the surface of said filament solely by its own force due to gravity and guided by said filament, said sliding means being totally supported by said filament for free movement thereon actuable retaining means for retaining said sliding means at a particular location on said filament, a time indicator, means for starting said time indicator and means for substantially simultaneously actuating said retaining means to inoperative position, whereby said time indicator is started and substantially simultaneously therewith said sliding means will start to slide freely along the surface of said filament, one of said last two means including a solenoid, a source of electric energy and a movable armature.

5. In a filament testing apparatus; supporting means for supporting at an angle a filament to be tested, sliding means adapted to be moved freely along the surface of said filament solely by its own force due to gravity, and guided by said filament, pivoted means for retaining said sliding means at a particular location on said filament when said pivoted means is in operative position, resilient means for normally retaining said pivoted means in operative position, a time indicator, means for starting said time indicator and including a movable armature, a solenoid adapted to be energized to actuate said armature, manually operable means for substantially simultaneously actuating said pivoted means to inoperative position and completing a circuit including said solenoid and a source of electric energy.

6. In a filament testing apparatus, supporting means for supporting at an angle a filament to be tested, means for maintaining said filament taut, the entire space immediately adjacent a major portion of said taut filament being completely unobstructed, sliding means adapted to be moved freely along the surface of said filament solely by its own force due to gravity, said sliding means being totally supported by said filament for free movement thereon actuable retaining means for retaining said sliding means at a particular location on said filament, a time indicator, means for starting said time indicator and including an electro-responsive means and an electric circuit including a source of electric energy and a solenoid for actuating said electro-responsive element when said solenoid is energized, means for substantially simultaneously actuating said retaining means to inoperative position completing said circuit, and means for breaking said circuit, said last means comprising a circuit including said electro-responsive means.

7. In a filament testing apparatus; supporting means for supporting at an angle a filament to be tested, means for maintaining said filament taut, the entire space immediately adjacent a major portion of said taut filament being completely unobstructed, sliding means adapted to be moved freely along the surface of said filament by its own force due to gravity, said sliding means being totally supported by said filament for free movement thereon actuable retaining means for retaining said sliding means at a particular location on said element, a time indicator, an electric circuit including a solenoid, a switch and a source of electric energy, means for actuating said retaining means to inoperative position and means operable simultaneously with said actuation to start said time indicator, said last two means operable in response to movement of a common manually operable means.

8. In a filament testing apparatus; supporting means for supporting at an angle to the horizontal a filament to be tested, sliding means adapted to be moved freely along the surface of said filament solely by its own force due to gravity, actuable retaining means for retaining said sliding means at a particular location on said filament, a time indicator, means for starting said time indicator and including a solenoid and electro-responsive means, means for actuating said retaining means to release said sliding means and means to stop said time indicator and comprising a circuit including said solenoid, a switch and a source of electric energy, trip means to maintain said switch open, said trip means actuated by said sliding means when it reaches a point on its travel along said element whereby said switch closes and said last mentioned circuit is made to actuate said electro-responsive means and stop said time indicator.

9. In a filament testing apparatus; supporting means for supporting at an angle to the horizontal, a thread, filament, wire or like unit to be tested, sliding means adapted to be moved freely along the surface of said unit solely by its own force due to gravity and guided thereby, actuable retaining means for retaining said sliding means at a particular location on said unit, a time indicator, means for substantially simultaneously starting said indicator and actuating said retaining means to release said sliding means, an electro-responsive means for stopping said time indicator, a circuit comprising a source of electric energy, a switch and a solenoid for actuating said electro-responsive means, trip means for maintaining said switch open, said sliding means on its travel along said unit adapted to actuate said trip means whereupon said switch is closed and said circuit is completed.

10. In a testing apparatus; supporting means for supporting at an angle to the horizontal, a thread, filament, wire or like unit to be tested, sliding means adapted to be moved along the surface of said unit by its own force due to gravity, actuable retaining means for retaining said sliding means at a particular location on said unit, a time indicator, means for substantially simultaneously starting said indicator and actuating said retaining means to release said sliding means, an electro-responsive means for stopping said time indicator, a circuit comprising a source of electric energy, a switch and a solenoid for actuating said electro-responsive means, trip means for maintaining said switch open, locking means for locking said trip means against accidental displacement, means for rendering said locking means inoperative, said sliding means on its travel along said unit adapted to actuate said trip means whereupon said switch is closed and said circuit is completed.

11. In a filament testing apparatus; supporting means for supporting at an angle to the horizontal a filament, thread, wire or like element to be tested, sliding means adapted to be moved solely by its own force due to gravity along the surface of said element, pivoted retaining means for retaining said sliding means at a particular location on said element, said pivoted retaining means carried by said support, a time indicator, means for actuating said pivoted means and including manually operable means, pivoted means for starting said time indicator, means for actuating said second mentioned pivoted means and including electro-responsive means, a circuit including a solenoid, a source of electric energy and said manually operable means, said electro-responsive means being actuated when said circuit is completed.

12. In a filament testing apparatus; supporting means for supporting at an angle to the horizontal a filament, thread, wire or like element to be tested, sliding means adapted to be moved solely by its own force due to gravity along the surface of said element, pivoted retaining means for retaining said sliding means at a particular location on said element, said pivoted retaining means carried by said support, a time indicator, means for actuating said pivoted means and including manually operable means, pivoted means for starting said time indicator, means for actuating said second mentioned pivoted means and including electro-responsive means, a circuit including a solenoid, a source of electric energy and said manually operable means, said electro-responsive means being actuated when said circuit is completed and means for breaking said circuit and including a circuit including a source of electric energy, a solenoid, electro-responsive means energized by said second mentioned solenoid and a switch including said first mentioned solenoid.

13. A filament testing apparatus comprising supporting means for supporting at an angle to the horizontal a filament, thread, wire or like element to be tested, sliding means adapted to be moved solely by its own force due to gravity along the surface of said element, pivoted retaining means for retaining said sliding means at a particular location on said element, said retaining means carried by said support, a time indicator, means for starting said time indicator and including a pivoted member and an electro-responsive element, a solenoid for actuating said electro-responsive element, a circuit including a switch, a source of electric energy and said solenoid, manually operable means for substantially simultaneously actuating said retaining means and making said circuit, means for breaking said circuit and including a circuit including a source of electric energy, a solenoid and electro-responsive means energized by said second mentioned solenoid, and a switch including said first mentioned solenoid, means for stopping said time indicator and including said pivoted member and said first mentioned electro-responsive element, a circuit including said first mentioned solenoid, a source of electric energy and a switch, trip means for maintaining said last mentioned switch open, said sliding means on its travel along said element adapted to actuate said trip means whereupon said switch is closed and said third mentioned circuit is completed.

LLOYD W. DAVIS.